UNITED STATES PATENT OFFICE.

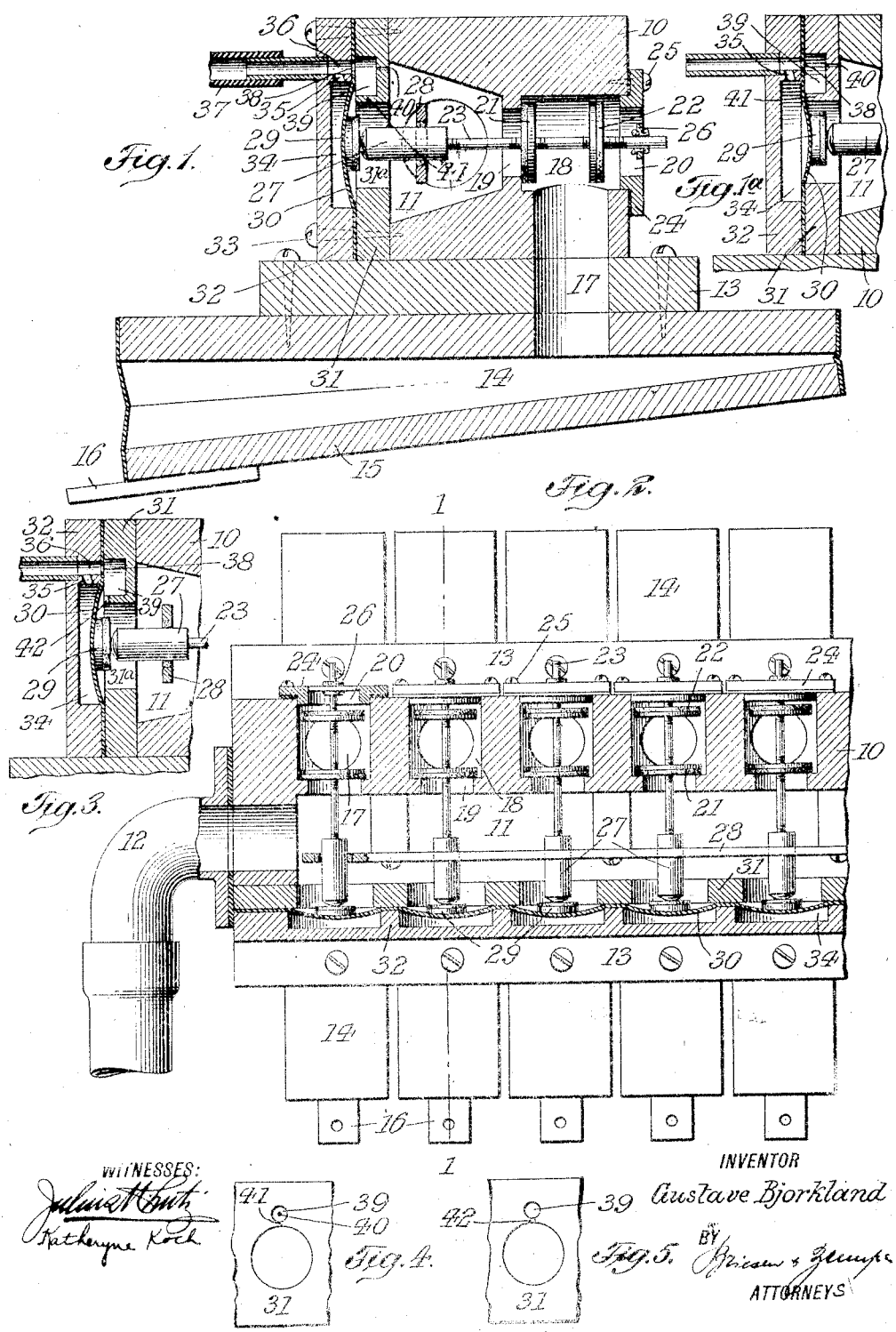
G. BJORKLAND.
PNEUMATIC ACTION FOR PLAYER PIANOS AND SIMILAR MUSICAL INSTRUMENTS.
APPLICATION FILED SEPT. 14, 1911.
1,023,986. Patented Apr. 23, 1912.
INVENTOR
Gustave Bjorkland

GUSTAVE BJORKLAND, OF BAYONNE, NEW JERSEY.

PNEUMATIC ACTION FOR PLAYER-PIANOS AND SIMILAR MUSICAL INSTRUMENTS.

1,023,986. Specification of Letters Patent. Patented Apr. 23, 1912.

Application filed September 14, 1911. Serial No. 649,221.

*To all whom it may concern:*

Be it known that I, GUSTAVE BJORKLAND, a citizen of the United States, residing at Bayonne, county of Hudson, and State of New Jersey, have invented a new and Improved Pneumatic Action for Player-Pianos and Similar Musical Instruments, of which the following is a specification.

The invention relates to a pneumatic action of novel construction in which a single valve is employed in lieu of the primary and secondary valves hitherto generally used. This desirable change is effected without diminishing the repeating quality of the instrument or causing an undesirable loss of vacuum. In this way, the construction is simplified, valuable space economized and the cost of the action considerably reduced.

The invention consists more particularly in providing in addition to the conventional bleed hole an air vent which is controlled by the diaphragm and which is adapted to establish ample supplementary communication between the vacuum chamber and the air space on the opposite side of the diaphragm. In this way the air is rapidly exhausted from said air space when the tracker bar opening is closed, so that quick repetition of the same note may be obtained.

The invention further comprises various novel features of construction, all as more fully pointed out in the appended claims.

In the accompanying drawing: Figure 1 is a cross section of a valve chest embodying my invention on line 1—1, Fig. 2; Fig. 1ª a similar section partly broken away, showing the parts in a different position; Fig. 2 a sectional plan view, partly broken away, of the valve chest; Fig. 3 a modification of the bleeding means; Fig. 4 a rear view of the diaphragm seat shown in Fig. 1, and Fig. 5 a rear view of the diaphragm seat shown in Fig. 3.

The valve chest 10 is provided with a longitudinal vacuum duct 11 from which the air is permanently withdrawn through pipe 12 in the usual manner. Chest 10 is shown to be mounted on a rail 13 to the lower face of which the pneumatics or elbows 14 are secured. The movable boards 15 of the latter are provided with arms 16 that engage the lifters of the piano hammers (not shown) as usual. Each bellows 14 communicates through passage 17 with a valve chamber 18 formed in chest 10 and adapted to be brought into communication with duct 11 or with the atmosphere through ports 19, 20, said ports being respectively controlled by disk valves 21, 22 which are adjustably mounted on a common stem 23. Each port 20 is preferably formed in a separate cap 24 removably secured to box 10 by screws 25 and provided with a bushed bearing 26 for stem 23. By thus employing a separate cap for each valve, the latter may be readily removed for adjustment, etc., without necessitating a dismantling of the valve action, as has heretofore been generally imperative. At its rear end each stem 23 is provided with an adjustable shoe 27 which is guided in a perforated bushed rail 28 mounted within duct 11. Shoe 27 bears against a cushioned plate 29 secured to the center of a pouch or diaphragm 30. The latter is preferably interposed between a pair of plates 31, 32 which are in turn secured to box 10 by screws 33, the plate 31 being provided with a circular opening 31ª accommodating shoe 27. Back of diaphragm 30, there is formed in plate 32 a recess 34 which is by port 35 connected to a passage 36. The latter communicates through flexible tube 37 with the corresponding opening of the tracker bar (not shown). In alinement with passage 36, the clamped section of diaphragm 30 is perforated as at 38 to establish communication between said passage and a chamber 39 formed in plate 31, while a bleed hole 40 permanently connects said chamber with duct 11. As clearly illustrated in Figs. 1 and 2, the diameter of opening 31ª is considerably smaller than that of recess 34, while the preferably circular chamber 39 extends in close proximity to opening 31ª, a comparatively thin web 41 separating said chamber and opening. Owing to this particular construction, chamber 39 will be partly uncovered when the diaphragm is raised off plate 31 (Fig. 1) to establish communication between chamber 39 and duct 11 in addition to that obtained by bleed hole 40, the parts 30, 31 thus constituting a diaphragm-controlled vent. When the diaphragh is drawn against plate 31 (Fig. 1ª), it will close chamber 39 against duct 11 so that the bleed hole 40 exclusively connects said chamber and duct.

Normally the valve spindle and diaphragm occupy the position illustrated in Fig. 1. As soon as a perforation of the tune sheet uncovers the corresponding tracker bar duct, air will be admitted through tube 37, passage 36 and port 35 into recess 34, thus permitting diaphragm 30 to be sucked toward duct 11 (Fig. 1ᵃ). In this way stem 23 will be shifted toward the right to close port 20 and open port 19, thereby collapsing bellows 14 and thus actuating the corresponding piano hammer. When the tracker bar duct is again closed by an imperforate portion of the tune sheet, vacuum will be established through bleed hole 40 behind the diaphragm, and the vacuum within duct 11 will draw disk 21 against its seat to admit air into bellows 14 and thereby expand the same. It will be seen that after diaphragm 30 has started to move from the position shown in Fig. 1ᵃ to that shown in Fig. 1, it will be raised off plate 31 to establish a comparatively large bleed between chamber 39 and opening 31ᵃ, in addition to bleed hole 40. In this way the air is rapidly withdrawn from behind the diaphragm, thus permitting a quick return movement of stem 23 and of the valve disks carried thereby. Although a large bleed area is thus formed between duct 11 and passage 36 during the return of the diaphragm, the diminutive bleed hole 40 only is open while the tracker bar opening is uncovered, so that the loss of vacuum is minimized.

In Figs. 1 and 2, the bleed hole is located opposite duct 36, so that it may be readily cleaned with a needle-like instrument inserted through said duct after tube 37 has been removed. In Fig. 3 the bleed is formed by a groove 42 cut into web 41. When the diaphragm 30 is drawn against its seat on plate 31, groove 42 only establishes communication between duct 11 and passage 36, while upon the withdrawal of the diaphragm from said seat, the desired large bleed is obtained.

From the foregoing, it is evident that with my novel single valve player action, the same result is obtained as has heretofore been possible only with a double or primary and secondary valve action, namely a quick withdrawal of the air from behind the diaphragm, to permit rapid repetition. The diaphragm of my single valve in swinging back and forth, will alternately open and close the air vent that supplements the exceedingly small bleed hole proper, thereby preventing any loss of vacuum as is the case when a large bleed is employed. In addition to rendering rapid repetition possible, economy of space is obtained, while the cost of the pneumatic action is considerably reduced.

I claim:

1. In a pneumatic valve action for player pianos and similar musical instruments, a valve chest having a vacuum duct, an air passage, a bleed permanently connecting said duct and passage, an air vent adapted to establish communication between the duct and passage in addition to the connection formed by the bleed, and a diaphragm controlling said vent.

2. In a pneumatic valve action for player pianos and similar musical instruments, a valve chest having a vacuum duct, an air passage, a bleed permanently connecting said duct and passage, an air vent adapted to establish communication between the duct and passage in addition to the connection formed by the bleed, a hammer actuating bellows, a valve controlling communication between the duct and said bellows, and a diaphragm coöperating with said valve and adapted to directly open and close said vent.

3. In a pneumatic valve action for player pianos and similar musical instruments, a valve chest having a vacuum duct, a diaphragm seat, a chamber opening into said seat, a diaphragm adapted to engage the seat and thereby separate the chamber from the duct, and a bleed for establishing permanent communication between the chamber and duct independent from the diaphragm-controlled vent.

4. In a pneumatic valve action for player pianos and similar musical instruments, a valve chest having a vacuum duct, a plate secured to said chest and having an opening and a chamber located in proximity to said opening, a diaphragm adapted to alternately establish and interrupt communication between said opening and chamber, and a bleed for establishing permanent communication between the chamber and duct independent from the diaphragm controlled vent.

GUSTAVE BJORKLAND.

Witnesses:
 Frank v. Briesen,
 Katheryne Koch.